April 9, 1963  D. E. LUPFER  3,085,000
PROCESS CONTROL SYSTEM
Filed Dec. 23, 1958  2 Sheets-Sheet 1

INVENTOR.
D. E. LUPFER
BY *Hudson & Young*
ATTORNEYS

INVENTOR.
D. E. LUPFER

BY Hudson & Young
ATTORNEYS

United States Patent Office 3,085,000
Patented Apr. 9, 1963

3,085,000
PROCESS CONTROL SYSTEM
Dale E. Lupfer, Bartlesville, Okla., assignor to Phillips Petroleum Company, a corporation of Delaware
Filed Dec. 23, 1958, Ser. No. 782,449
2 Claims. (Cl. 23—260)

This invention relates to the production of ammonium nitrate solutions of predetermined concentrations. In another aspect it relates to the measurement of changes in the time rate of change of signals.

Ammonium nitrate is commonly prepared in the form of small pellets or prills for use as fertilizer. These prills can be formed by spraying liquid ammonium nitrate into the top of a prilling tower, whereby the droplets solidify in descending through the tower to form the prills. It is important that the concentration of the aqueous ammonium nitrate solution which is to be prilled be maintained within a very narrow range from about 94.5 to 96.0 percent, and preferably within the range of 95.0 to 95.5 percent ammonium nitrate by weight. Solutions having concentrations outside this range generally do not produce satisfactory prills. A more concentrated solution may tend to solidify or freeze in the spray head of the prilling tower. A less concentrated solution tends to produce mushy or oblong prills which contain an excessive amount of water and tend to cake when bagged and put into storage.

Heretofore, the concentration of the ammonium nitrate solution has generally been controlled manually in response to periodic measurements of the fudge point of the solution. The fudge point of such a solution is the temperature at which the nuclei of ammonium nitrate is formed for subsequent crystallization. The fudge point of a concentrated aqueous solution of ammonium nitrate, which is proportional to the concentration of the solution, can be measured by slowly cooling a sample of the concentrated solution and detecting the point at which the rate of change of temperature increases. However this change in changing rate is difficult to detect automatically so that control systems based thereon have not been entirely reliable.

In accordance with the present invention, novel apparatus is provided which is capable of measuring the fudge point of the ammonium nitrate solution automatically by detecting discontinuities in the time rate of change of the cooling rate of the solution. In response to the output signal of the apparatus of this invention, the ammonium nitrate production system can be controlled automatically so that the concentration of the ammonium nitrate solution which is passed to the prilling tower is maintained constant at a desired value.

Accordingly, it is an object of this invention to provide apparatus for preparing ammonium nitrate solutions of predetermined concentrations.

Another object is to provide apparatus for measuring the concentration of ammonium nitrate solutions.

A further object is to provide apparatus for detecting discontinuities in the time rates of change of signals.

Other objects, advantages and features of this invention should become apparent from the following detailed description which is taken in conjunction with the accompanying drawing in which.

Figure 1:
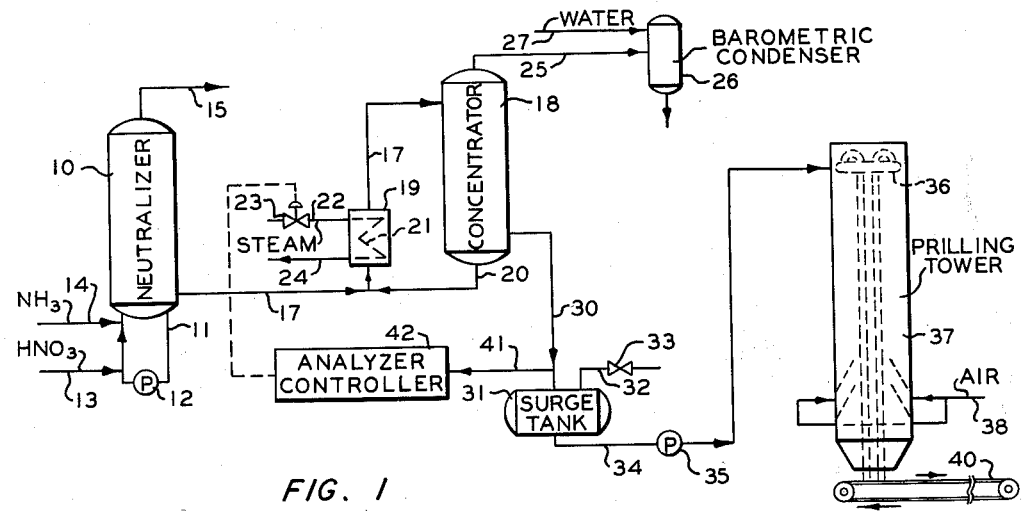
FIGURE 1 is a schematic representation of an ammonium nitrate prilling process having the control system of the present invention incorporated therein.

Referring now to the drawing in detail and to FIGURE 1 in particular, there is shown a schematic representation of apparatus which can be employed to produce aqueous ammonium nitrate solutions and to form prills of ammonium nitrate. The ammonium nitrate is produced by the reaction of gaseous ammonia with nitric acid. This reaction is carried out in a neutralizer vessel 10 which is designed to receive a proper ratio of ammonia gas and nitric acid in a circulating stream. A substantial amount of the resulting ammonium nitrate solution is withdrawn from the bottom of neutralizer 10 through a conduit 11 which has a pump 12 therein. A conduit 13 introduces aqueous nitric acid into conduit 11 on the discharge side of pump 12. The gaseous ammonia is then introduced into conduit 11 through a conduit 14 to neutralize the circulating stream. The resulting solution is returned to neutralizer 10 through conduit 11. The temperature rise due to the heat of reaction causes evaporation of water and concentration of the ammonium nitrate solution. The steam which is formed by the heat of reaction is removed from neutralizer 10 through a conduit 15. The reaction generally is controlled so that the pH of the condensed stream removed through conduit 15 is within the range of approximately 9 to 11, which indicates an excess of ammonia. This excess of ammonia is desired so that no excess nitric acid is contained in the finished product.

The ammonium nitrate solution is removed from neutralizer 10 through a conduit 17 which communicates with a concentrator 18 through a heat exchanger 19. A portion of the liquid in concentrator 18 is circulated to the inlet of heat exchanger 19 by means of a conduit 20. Steam or other heating medium is introduced into a coil 21 in heat exchanger 19 by means of an inlet conduit 22 which has a control valve 23 therein. The spent steam is removed through an outlet conduit 24. The ammonium nitrate solution in concentrator 18 is heated sufficiently to increase the concentration of the solution to the desired range of from approximately 94.5 to 96.0 percent. The resulting steam is removed from concentrator 18 through a conduit 25 which communicates with a barometric condenser 26. Cooling water is introduced into condenser 26 through a conduit 27. Condenser 26 maintains the pressure in concentrator 18 less than atmospheric to facilitate the concentration process.

The concentrated ammonium nitrate solution is withdrawn from concentrator 18 through a conduit 30 which communicates with a surge tank 31. Because of the reduced pressure in concentrator 18, a liquid level normally exists in conduit 30 above the top of surge tank 31. Any excess pressure in tank 31 can be vented through a conduit 32 which has a normally open valve 33 therein. The ammonium nitrate solution in tank 31 is removed through a conduit 34 which has a pump 35 therein. This solution is passed to a spray head 36 in the top of a prilling tower 37. Air is introduced into the lower region of tower 37 by means of an inlet conduit 38. The ammonium nitrate droplets solidify in descending through the rising column of air in tower 37 so that solid prills are removed from the bottom of tower 37 by a conveyor belt 40.

In accordance with the present invention, a sample stream of the ammonium nitrate solution supplied to tower 37 is directed by means of a conduit 41 to an analyzer-controller 42. Conduit 41 can advantageously communicate with conduit 30 at a region above surge tank 31. Analyzer 42 provides an output signal which is representative of the concentration of the ammonium nitrate solution. This signal controls the operation of the concentrating process in the manner described hereinafter in detail so that the ammonium nitrate solution directed to tower 37 is maintained at a predetermined concentration. The control is accomplished by adjusting valve 23 to regulate the amount of steam supplied to heat exchanger 19.

Figure 2:
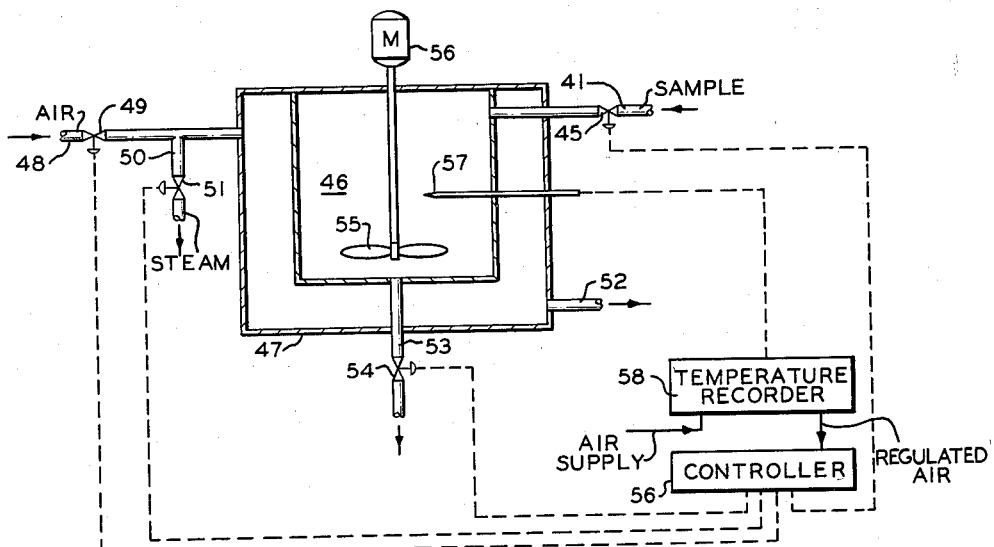
FIGURE 2 is a schematic representation of a cooling chamber employed to measure the fudge point of the ammonium nitrate solution.

With reference to FIGURE 2, sample conduit 41, which has a control valve 45 therein, communicates with the interior of a vessel 46. Vessel 46 is provided with a jacket 47 through which heating and cooling mediums can be circulated. A conduit 48, which has a control valve 49 therein, communicates with jacket 47 to supply air. A conduit 50, which has a control valve 51 therein, communicates with jacket 47 to supply steam. A vent conduit 52 communicates with jacket 47, and a vent conduit 53, which has a control valve 54 therein, communicates with vessel 46. An impeller 55 which is rotated by a motor 56 is disposed within vessel 46 to stir the sample solution. A temperature detector 57, which can be a thermistor or a thermocouple, for example, is mounted within vessel 46 and is connected to a temperature recorder 58 that establishes an output air pressure representative of the temperature within vessel 46. This pressure is applied to a controller 59 which operates valves 45, 49, 51 and 54 in the sequence described hereinafter.

Figure 3:
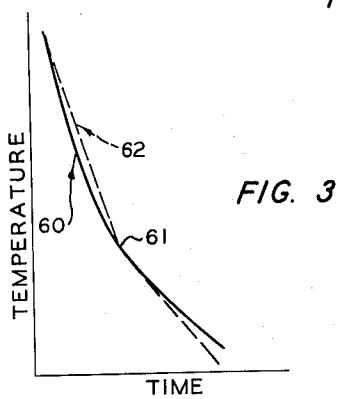
FIGURE 3 is a graphical representation of the change in temperature with respect to time of an ammonium nitrate solution which is being cooled.

In the operation of the control system of this invention, samples of ammonium nitrate solution are introduced into vessel 46 periodically. Air is then introduced into jacket 47 so that the ammonium nitrate solution is cooled slowly. FIGURE 3 is a graphical representation of typical cooling curves which are provided by recorder 58. The dotted curve 62 is an ideal curve which illustrates that the time rate of change of temperature changes rather abruptly at a temperature 61 which represents the fudge point. In actual practice, the curves obtained often do not exhibit such an abrupt change, and are more nearly of the form of curve 60 wherein the discontinuity is not readily apparent.

Figure 4:
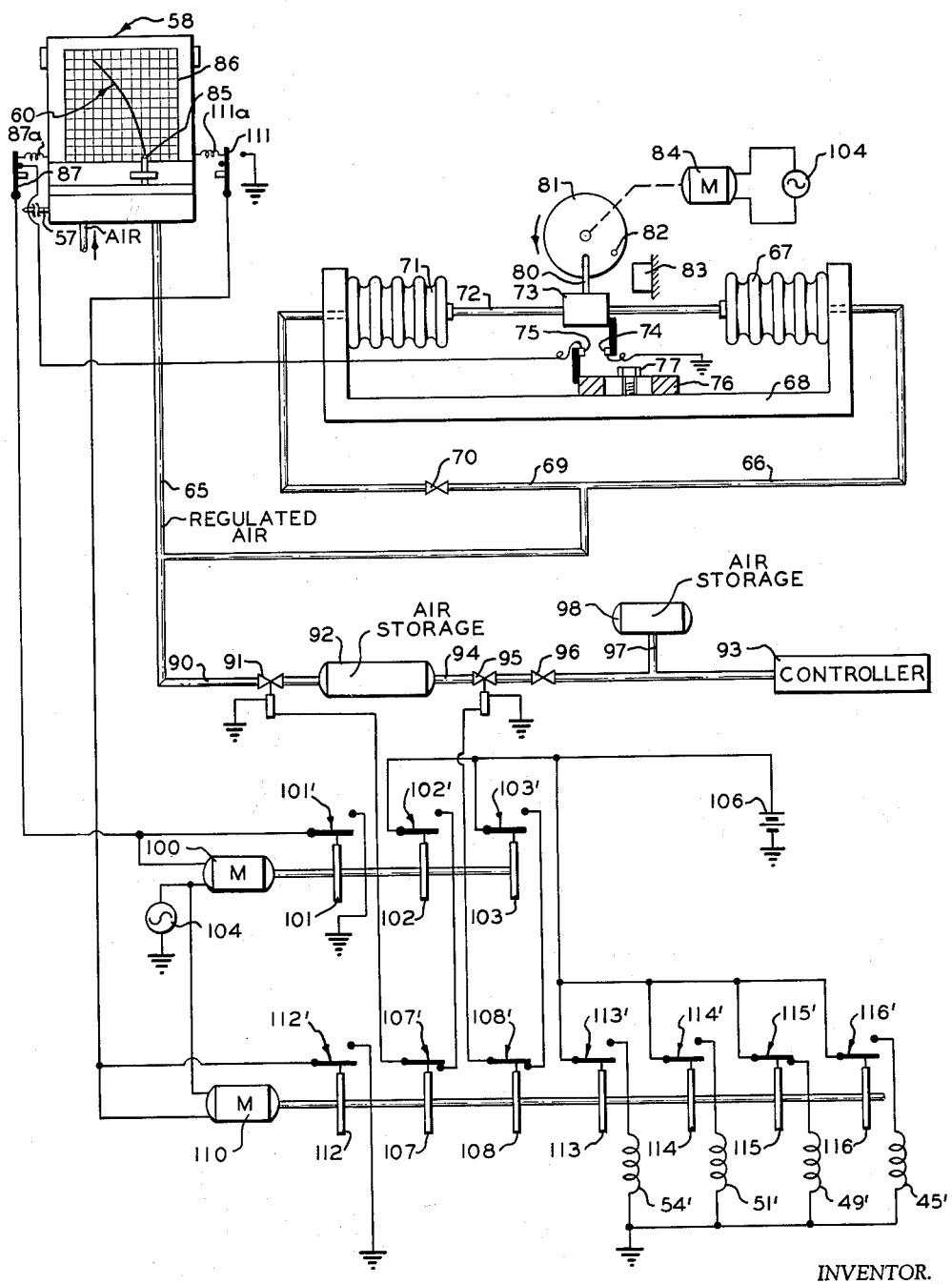
FIGURE 4 is a schematic representation of the fudge point detection and control system of this invention.

Controller 56 is illustrated schematically in FIGURE 4. Recorder 58 establishes an output pneumatic pressure which varies inversely with the measured temperature. Thus, the output pressure in line 65 increases as the measured temperature decreases. Air line 65 is connected to an air line 66 which communicates with the interior of a first bellows 67 that is mounted on a support 68. Air line 65 also communicates with an air line 69 which communicates through a restriction 70 with the interior of a second bellows 71 that is also mounted on support 68. Bellows 67 and 71 are positioned in spaced relationship with one another and the free ends of the bellows are connected by a rod 72. A block 73 is mounted on rod 72 and carries a first grounded electrical contact 74. A second electrical contact 75 is carried by a support 76 which is adjustably secured to a support 68 by means of a screw 77. In this manner, the initial spacing between electrical contacts 74 and 75 can be varied. A lever 80 is carried by block 73 and extends upwardly therefrom. A disk 81, which has a pin 82 mounted near the periphery thereof, is positioned above lever 80 so that rotation of the disk in a counter-clockwise direction results in pin 82 pushing lever 80 to the right until block 73 engages a stationary block 83. Disk 81 is rotated by a motor 84 which is energized by a current source 104. Block 73 can be secured to rod 72 by a light friction fit so that the block moves with rod 72 after being reset against stop 83. Alternatively, lever 80 can operate a lock mechanism which holds block 73 to rod 72.

At the beginning of the analysis cycle, the ammonium nitrate solution in vessel 46 is at a relatively high temperature so that pen 85 of recorder 58 is on the left side of chart 86 and the output pressure in line 65 is relatively high. With the recording pen at the left side, switch 87 is tripped closed by the recording pen at about the 5% position on the chart. During the time it takes to cool 5%, block 73 is positioned properly with respect to rod 72, for the initial cooling rate, by pin 82.

When the cooling starts, the pressure in line 65 decreases at a fairly constant rate and rod 72 moves to the right. This all takes place before switch 87 is closed by the recording pen. After the cooling has progressed about 5% of the chart, the pen closes switch 87. However, block 73 has been properly positioned so that contacts 74 and 75 are still open. These contacts remain open so long as the initial cooling rate exists. Actually the rate of cooling is gradually decreasing and rod 72 is gradually moving to the left. However, for this small change in cooling rate, pin 82 keeps repositioning block 73 to keep contacts 74 and 75 open for this small gradual changing rate. When the fudge point is reached there is a sharp decrease in cooling rate so that rod 72 moves sharply to the left. This movement comes about not because of an increase in pressure in bellows 67, but because the differential pressure between bellows 71 and 67 is less. It should be noted that at the fudge point the change in pressure with respect to time decreases. Before the fudge point is reached there is a relatively large differential pressure between bellows 71 and 67. After the fudge point is reached there is a smaller differential pressure which moves the rod 72 to the left to close contacts 74 and 75.

Air line 65 communicates with an air line 90 which is connected through a solenoid operated valve 91 to a storage tank 92. Storage tank 92 is connected to a controller 93 by means of an air line 94 that has a solenoid operated valve 95 and a restriction 96 therein. An air line 97 communicates between a second storage tank 98 and line 94 between valve 96 and controller 93. The volume of storage tank 98 is substantially smaller than the volume of storage tank 92. At the beginning of the analysis cycle, valve 91 is open and valve 95 is closed. Valve 91 is closed when the fudge point of the cooling curve is reached so that the air pressure trapped in storage tank 92 is representative of the temperature at which the fudge point occurs. Valve 95 is then opened so that this pressure is applied to controller 93 which in turn establishes an output signal that adjusts valve 23 of FIGURE 1. The combination of restriction 96 and storage tank 98 is designed so that the pressure in storage tank 92 is transmitted to controller 93 over a period of time which corresponds to the period between individual analyses of samples of the ammonium nitrate solution, thereby providing a continuous output signal.

The operation of valves 91 and 95 of FIGURE 4 and valves 45, 49, 51 and 54 of FIGURE 2 is controlled by the timing circuit illustrated in FIGURE 4. The drive shaft of a first constant speed motor 100 carries cams 101, 102 and 103 which actuate respective switches 101', 102' and 103'. The first terminal of a current source 104 is connected to ground, and the second terminal of current source 104 is connected through motor 100 and switch 87 to contact 75. As previously discussed, contact 75 is engaged by grounded contact 74 when the fudge point on the cooling curve is reached. This serves to energize timing motor 100. Switch 87 is held open by pen 85 during the initial part of the cooling curve to prevent any temperature fluctuations from energizing motor 100. By the time the fudge point is reached, switch 87 is closed. Cam 101 is designed so that switch 101′ is closed immediately when motor 100 is energized and remains closed until one cycle of the timing operation is completed. Closure of switch 101′ results in the second terminal of motor 100 being connected to ground so that the motor remains energized until the cycle is completed even though contact 74 may subsequently move out of engagement with contact 75. The first terminal of a current source 106 is connected to ground, and the second terminal of this current source is connected to first terminals of switches 102′ and 103′. The second terminal of switch 102′ is connected to ground through a switch 107′ and the solenoid of valve 91. The second terminal of switch 103′ is connected to ground through a switch 108′ and the solenoid of valve 95. Cam 102 is designed so that switch 102′ closes as soon as motor 100 is energized. This energizes the solenoid of valve 91 to close the valve and thereby trap an air pressure in tank 92 representative of the fudge point. Cam 103 is designed so that switch 103′ is closed shortly thereafter to energize the solenoid of valve 95 to open this valve. Valve 91 is closed when its solenoid is energized, while valve 95 is opened when its solenoid is energized.

The second terminal of current source 104 is also connected to ground through a second timing motor 110 and a switch 111. At the end of the cooling curve, pen 85 of recorder 58 closes switch 111 against the force of a spring 111a so that motor 110 is energized. The drive shaft of motor 110 carries cams 112, 107, 108, 113, 114, 115 and 116 which actuate respective switches 112′, 107′, 108′, 113′, 114′, 115′, and 116′. Cam 112 closes switch 112′ at the beginning of the cycle so that the second terminal of motor 110 remains grounded to insure that the timing cycle of motor 110 is completed after pen 85 moves out of engagement with switch 111.

Solenoids 54′, 51′, 49′ and 45′ are connected in circuit with current source 106 through respective switches 113′, 114′, 151′ and 116′. These solenoids open the corresponding valves in FIGURE 2 when energized. At the completion of the cooling curve, cam 113 closes switch 113′ to energize solenoid 54′ to open steam valve 51, and solenoid 49′ is deenergized to close air valve 49. The passage of steam through jacket 47 melts the ammonium nitrate crystals within vessel 46 so that the cooled sample is removed through drain conduit 53. Thereafter, solenoid 45′ is energized to open valve 45 to admit a new sample into tank 46. This sample is permitted to flow through tank 46 for a period of time to flush out the previous sample. Valves 45, 51 and 54 are then closed and valve 49 is opened to initiate a second analysis cycle. The cams carried by the drive shaft of timing motor 110 are designed to perform these switching operations in the sequence described.

At the end of the flushing and refilling of vessel 46, cams 107 and 108 open respective switches 107′ and 108′ to insure that valve 91 is open and valve 95′ is closed at the start of the second cooling curve. Switches 107′ and 108′ are closed at the end of the timing cycle of motor 110 which occurs during the initial part of the second cooling curve. The timing cycle of motor 100 is set to end prior to the break in the second cooling curve and prior to the closing of switches 107′ and 108′ so that switches 102′ and 103′ are opened in anticipation of the second fudge point.

In one specific embodiment of the control system of this invention, a 55 percent aqueous solution of nitric acid is added to neutralizer 10 at the rate of approximately 54.6 gallons per minute. Ammonia at a pressure of approximately 75 pounds per square inch gauge and at a temperature of 40° C. is supplied to neutralizer 10 at a rate of 365 cubic feet per minute. The resulting solution is circulated through conduit 11 at a rate of approximately 5,300 gallons per minute. This provides approximately a 75 percent aqueous ammonium nitrate solution in neutralizer 10 at a temperature of approximately 175° C. and at a pressure of 65 pounds per square inch absolute. The solution is concentrated to approximately 95 per cent in concentrator 18 which is maintained at a temperature of approximately 140° C. and at a pressure of approximately 280 millimeters of mercury. The resulting solution is sprayed into the top of tower 37 at a rate of approximately 37.8 gallons per minute. Air is introduced into tower 37 at a rate of approximately 150,000 cubic feet per minute. The height of column 37 is approximately 130 feet, and the prills are removed at a temperature of approximately 75° C. Sufficient steam is supplied to heat exchanger 19 to maintain the concentration of ammonium nitrate in concentrator 18 at the indicated value.

The ammonium nitrate sample supplied to analyzer 42 normally is at a temperature of approximately 140° C. This sample is cooled in vessel 46 by the circulation of air through jacket 47. The fudge point occurs at a temperature in the general range of approximately 125 to 127° C. which represents the fudge point of an ammonium nitrate solution having a concentration of approximately 95 to 95.5 percent. If the measured fudge point temperature should exceed a predetermined value, 126° C. for example, controller 93 tends to close valve 23 so that less steam is supplied to heat exchanger 19. Conversely, if the measured fudge point temperatures should fall below a predetermined value, 126° C. for example, valve 23 is opened to supply more steam to heat exchanger 19. In this manner it is possible to maintain the concentration of ammonium nitrate solution passed to detector 37 at a constant predetermined value which gives the best prills in a given prilling tower.

While the invention has been described in conjunction with a present preferred embodiment, it should be evident that it is not limited thereto.

What is claimed is:

1. Apparatus for producing an aqueous solution of ammonium nitrate of predetermined concentration which comprises mixing means to contact nitric acid with ammonia, evaporating means having heating means associated therewith, means to pass ammonium nitrate from said mixing means to said evaporating means, means to withdraw ammonium nitrate from said evaporating means, a vessel, means to pass a sample of ammonium nitrate to said vessel from said means to withdraw, means to cool said vessel, means to measure the temperature of ammonium nitrate in said vessel, means responsive to said means to measure, to establish a pneumatic pressure representative of the temperature of ammonium nitrate in said vessel, first and second bellows, means rigidly supporting first ends of said bellows so that the second ends thereof are in facing spaced relationship, a rod connecting the second ends of said bellows so that expansion of one results in compression of the other, a first conduit having a first end thereof communicating with the interior of said first bellows, a second conduit having a first end thereof communicating with the interior of said second bellows, the effective cross-sectional area of said second conduit means being smaller than the effective cross-sectional area of said first conduit, means connecting the second ends of said conduits to said means to establish a pneumatic pressure, a member adjustably secured to said rod so as to move with said rod, means positioned adjacent said member to move said member along said rod periodically in a first direction, means to detect movement of said member a preselected distance in a second direction opposite said first direction in response to movement of said rod in another second direction, means responsive to said means to detect movement to adjust the heating means associated with said evaporating means.

2. The apparatus of claim 1 wherein the means responsive to said means to detect movement comprises third conduit means connecting said means to provide the pressure to be detected and a storage means having a restricted inlet and outlet to same and fourth conduit means connecting said storage means and said controller and having an effective cross-sectional area smaller than that of said third conduit.

References Cited in the file of this patent

UNITED STATES PATENTS

| | | |
|---|---|---|
| 1,881,266 | DeGiers | Oct. 4, 1932 |
| 1,899,672 | Clark | Feb. 28, 1933 |
| 2,167,464 | Rogers et al. | July 25, 1939 |
| 2,445,335 | Philbrick et al. | July 20, 1948 |
| 2,650,660 | Martin et al. | Sept. 1, 1953 |
| 2,696,464 | Mathis | Dec. 7, 1954 |
| 2,787,443 | Meagher et al. | Apr. 2, 1957 |
| 2,863,737 | Green | Dec. 9, 1958 |